(12) United States Patent
Inao et al.

(10) Patent No.: US 9,735,556 B2
(45) Date of Patent: Aug. 15, 2017

(54) WIRE HARNESS EXTERIOR MEMBER AND WIRE HARNESS

(71) Applicant: Yazaki Corporation, Tokyo (JP)

(72) Inventors: Shinichi Inao, Makinohara (JP);
Hideomi Adachi, Makinohara (JP);
Tatsuya Oga, Makinohara (JP);
Takeshi Ogue, Makinohara (JP);
Masaaki Suguro, Makinohara (JP);
Yoshiaki Ozaki, Makinohara (JP);
Hiroyuki Yoshida, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/602,398

(22) Filed: Jan. 22, 2015

(65) Prior Publication Data
US 2015/0136481 A1 May 21, 2015

Related U.S. Application Data

(63) Continuation of application No. PCT/JP2013/072550, filed on Aug. 23, 2013.

(30) Foreign Application Priority Data

Aug. 23, 2012 (JP) .................................. 2012-183752

(51) Int. Cl.
*H02G 3/04* (2006.01)
*B60R 16/02* (2006.01)
*F16L 57/00* (2006.01)

(52) U.S. Cl.
CPC ....... *H02G 3/0406* (2013.01); *B60R 16/0207* (2013.01); *B60R 16/0215* (2013.01); *F16L 57/00* (2013.01); *H02G 3/0481* (2013.01); *H02G 3/0487* (2013.01)

(58) Field of Classification Search
CPC .................................... H02G 3/04; H02G 3/32
USPC ........................................................ 174/72 C
See application file for complete search history.

(56) References Cited

U.S. PATENT DOCUMENTS

| | | | | |
|---|---|---|---|---|
| 6,666,232 | B2 * | 12/2003 | Lepoutre | .......... F02M 35/10137 138/119 |
| 2004/0099427 | A1 * | 5/2004 | Kihira | ................. B60L 11/1803 174/359 |
| 2005/0011687 | A1 * | 1/2005 | Yamaguchi | .............. B60K 6/48 180/65.1 |

(Continued)

FOREIGN PATENT DOCUMENTS

| | | |
|---|---|---|
| FR | 2962603 A1 | 1/2012 |
| JP | 2004-171952 A | 6/2004 |

(Continued)

OTHER PUBLICATIONS

Written Opinion dated Oct. 22, 2013 issued by International Searching Authority in counterpart International Application No. PCT/JP2013/072550.

(Continued)

*Primary Examiner* — William H Mayo, III
*Assistant Examiner* — Krystal Robinson
(74) *Attorney, Agent, or Firm* — Sughrue Mion, PLLC

(57) ABSTRACT

An exterior member has a straight tube body to be arranged at a vehicle underfloor portion of a vehicle and at least one rigidity adding portion to add rigidity to the straight tube body.

14 Claims, 8 Drawing Sheets

(56) References Cited

U.S. PATENT DOCUMENTS

| | | |
|---|---|---|
| 2010/0283287 A1 | 11/2010 | Toyozumi et al. |
| 2013/0008711 A1 | 1/2013 | Toyama et al. |
| 2015/0251609 A1* | 9/2015 | Sugimoto ........... B60R 16/0215 174/68.3 |

FOREIGN PATENT DOCUMENTS

| | | | |
|---|---|---|---|
| JP | 2004173453 A * | 6/2004 | |
| JP | 2004224156 A | 8/2004 | |
| JP | 2009143326 A * | 7/2009 | |
| JP | 2010-13046 A | 1/2010 | |
| JP | 2011193677 A | 9/2011 | |
| WO | 2008/068980 A1 | 6/2008 | |

OTHER PUBLICATIONS

Int. Search Report dated Oct. 22, 2013 issued in International Application No. PCT/JP2013/072550 (PCT/ISA/210).
Written Opinion dated Oct. 22, 2013 issued in International Application No. PCT/JP2013/072550 (PCT/ISA/237).
Office Action dated Jun. 21, 2016 issued by the Japanese Patent Office in counterpart Japanese Patent Application No. 2012-183752.
Search Report dated Mar. 4, 2016, issued by the European Patent Office in counterpart European Application No. 13830678.2.
Communication dated Aug. 2, 2016 issued by the State Intellectual Property Office of People's Republic of China in counterpart Chinese Application No. 201380044010.9.
Communication dated Mar. 10, 2017, issued by the State Intellectual Property Office of P.R. China in counterpart Chinese application No. 201380044010.9.
Communication dated May 16, 2017, issued by the European Patent Office in counterpart European Application No. 13830678.2.

* cited by examiner

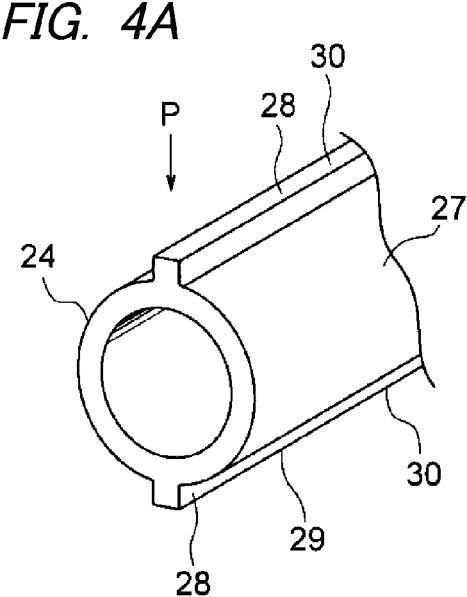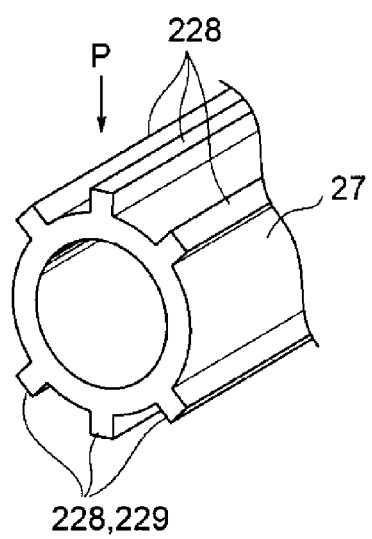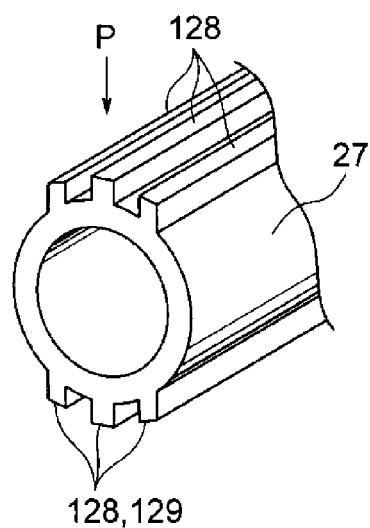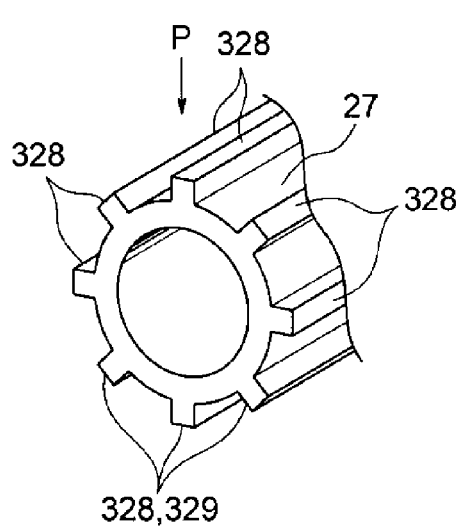

WIRE HARNESS EXTERIOR MEMBER AND WIRE HARNESS

CROSS REFERENCE TO RELATED APPLICATIONS

This application is a continuation of International Patent Application No. PCT/JP2013/072550 filed on Aug. 23, 2013, claiming priority from Japanese Patent Application No. 2012-183752 filed on Aug. 23, 2012, the contents of which are incorporated herein by reference.

FIELD OF INVENTION

The present invention relates to a wire harness exterior member and a wire harness including this exterior member.

BACKGROUND ART

High-voltage (i.e., for high voltage) wire harnesses are used as components for electrical connection between a battery and an inverter unit of a hybrid car or an electric car. Some wire harnesses for the electrical connection between the battery and the inverter unit include a plurality of high-voltage conducting paths and an exterior member for protecting these conducting paths (see Patent Document 1 identified below).

Patent Document 1: JP 2004-171952 A

In the field of automobiles such as hybrid cars and electric cars, efforts and studies have been continued toward the realization of reduction in the weight and cost of mounted parts and the like. Under such circumstances, the inventors of the present application consider reducing the thickness of the exterior member in reducing the weight and cost of the wire harness. However, the realization is difficult only by reducing the thickness of the exterior member. This is because the longer the exterior member reduced in thickness is, the more readily deformation occurs due to the influence of self weight and the like; for this reason, for example, the workability at the time of manufacture of the wire harness and the workability at the time of fixing of the wire harness to a vehicle body can be impaired.

SUMMARY OF INVENTION

The present invention has been made in view of the above circumstances, and it is an object thereof provide a wire harness exterior member and a wire harness that enable thickness reduction.

To solve the above-mentioned problem, the wire harness exterior member and the wire harness according to the present invention have the following features (1) to (9):

(1) A wire harness exterior member having a shape of a tube body covering a conducting path, the wire harness exterior member including a straight tube body to be arranged at a vehicle underfloor portion of a vehicle and at least one rigidity adding portion to add rigidity to the straight tube body.

(2) The wire harness exterior member according to (1) described above, wherein the rigidity adding portion is provided so as to protrude on an outer surface of the straight tube body, or the rigidity adding portion is formed such that the straight tube body is deformed outward.

(3) The wire harness exterior member according to (1) described above, wherein the rigidity adding portion is provided so as to protrude on an inner surface of the straight tube body, or the rigidity adding portion is formed such that the straight tube body is deformed inward.

(4) The wire harness exterior member according to (2) or (3) described above, wherein the rigidity adding portion is formed such that a surface area of the straight tube body is large as compared with a case where a cross section of the straight tube body is circular.

(5) The wire harness exterior member according to any one of (1) to (4) described above, wherein the rigidity adding portion is formed in a shape extending in an axial direction of the straight tube body.

(6) The wire harness exterior member according to any one of (1) to (5) described above, including a straight tube portion having the straight tube body and the rigidity adding portion and formed as an inflexible portion, and a flexible tube portion continuing from the straight tube portion and formed as a flexible portion.

(7) The wire harness exterior member according to any one of (1) to (6) described above, wherein the rigidity adding portion is provided at a vertically lower side of the outer surface of the straight tube body in a state of being fixed to the vehicle underfloor portion.

(8) The wire harness exterior member according to any one of (1) to (7) described above, wherein the rigidity adding portion is provided also at a vertically upper side of the outer surface of the straight tube body in the state of being fixed to the vehicle underfloor portion.

(9) A wire harness including the wire harness exterior member according to any one of (1) to (8) described above, and a conducting path covered by the wire harness exterior member.

According to the wire harness exterior member of (1) described above, since at least one rigidity adding portion for adding rigidity is provided, the second moment of area of the straight tube body can be increased by this rigidity adding portion. Therefore, a necessary and sufficient rigidity is easily secured. Consequently, according to the wire harness exterior member of (1) described above, the straight tube body can be reduced in thickness, so that the weight and cost can be reduced. Moreover, according to the wire harness exterior member of (1) described above, since the rigidity can be secured by the rigidity adding portion, even if the straight tube body is reduced in thickness, the straight tube body can be prevented from being deformed. Consequently, according to the wire harness exterior member of (1) described above, for example, the workability at the time of manufacture of the wire harness and the workability at the time of fixing of the wire harness to the vehicle body and the like can be improved. Further, according to the wire harness exterior member of (1) described above, since the rigidity adding portion is provided, this rigidity adding portion can be used for improving the durability against external causes such as a curb.

In the wire harness exterior member of (2) described above, the rigidity adding portion is provided so as to protrude on the outer surface of the straight tube body or is formed such that the straight tube body is deformed inward. For this reason, according to the wire harness exterior member of (2) described above, the rigidity adding portion can be used not only as the portion that adds rigidity but also for securing anti-chipping performance and for improving heat radiation performance.

In the wire harness exterior member of (3) described above, the rigidity adding portion is provided so as to protrude on the inner surface of the straight tube body or is formed such that the straight tube body is deformed inward. For this reason, according to the wire harness exterior member of (3) described above, the rigidity adding portion can be used not only for adding rigidity but also for improving heat radiation performance. Moreover, according to the wire harness exterior member of (3) described above, since the rigidity adding portion does not protrude outward, attachment of post-fitting parts is facilitated, and at the time of fixing of the wire harness to the vehicle body, work is not obstructed.

According to the wire harness exterior member of (4) described above, since the surface area of the straight tube body is large compared with a case where the cross section of the straight tube body is circular, heat radiation performance is higher by the amount of surface area increase.

According to the wire harness exterior member of (5) described above, since the rigidity adding portion is formed in the configuration extending in the axial direction of the straight tube body, a wire harness exterior member that can be formed by extrusion molding can be provided.

According to the wire harness exterior member of (6) described above, a wire harness exterior member having the straight tube portion and the flexible tube portion can be provided.

In the wire harness exterior member of (7) described above, the rigidity adding portion is provided at the vertically lower portion of the outer surface of the straight tube body in the state of being fixed to the vehicle underfloor portion. Therefore, the rigidity adding portion can be used not only for adding rigidity but also for securing anti-chipping performance and for improving the durability against external causes such as a curb.

According to the wire harness exterior member of (8) described above, the rigidity adding portion is provided at the vertically lower side of the outer surface of the straight tube body and at the vertically upper side situated on the opposite side in the state of being fixed to the vehicle underfloor portion, the rigidity of the straight tube body can be enhanced. Thereby, according to the wire harness exterior member of the above (8), the straight tube body can be further reduced in thickness.

According to the wire harness of (9) described above, since the wire harness exterior member of any one of (1) to (8) described above is included, a wire harness can be provided the weight and cost of which can be reduced and further, that is also excellent in anti-chipping performance, workability and the like.

BRIEF DESCRIPTION OF THE DRAWINGS

FIG. 4A to FIG. 4D are perspective views of another example of a rigidity adding portion;

EMBODIMENTS OF INVENTION

A wire harness according to the present embodiment includes a conducting path and a wire harness exterior member accommodating and protecting this wire harness. The wire harness exterior member is a tube body made of a resin or a metal, and has a rigidity adding portion for adding rigidity.

Figure 1:
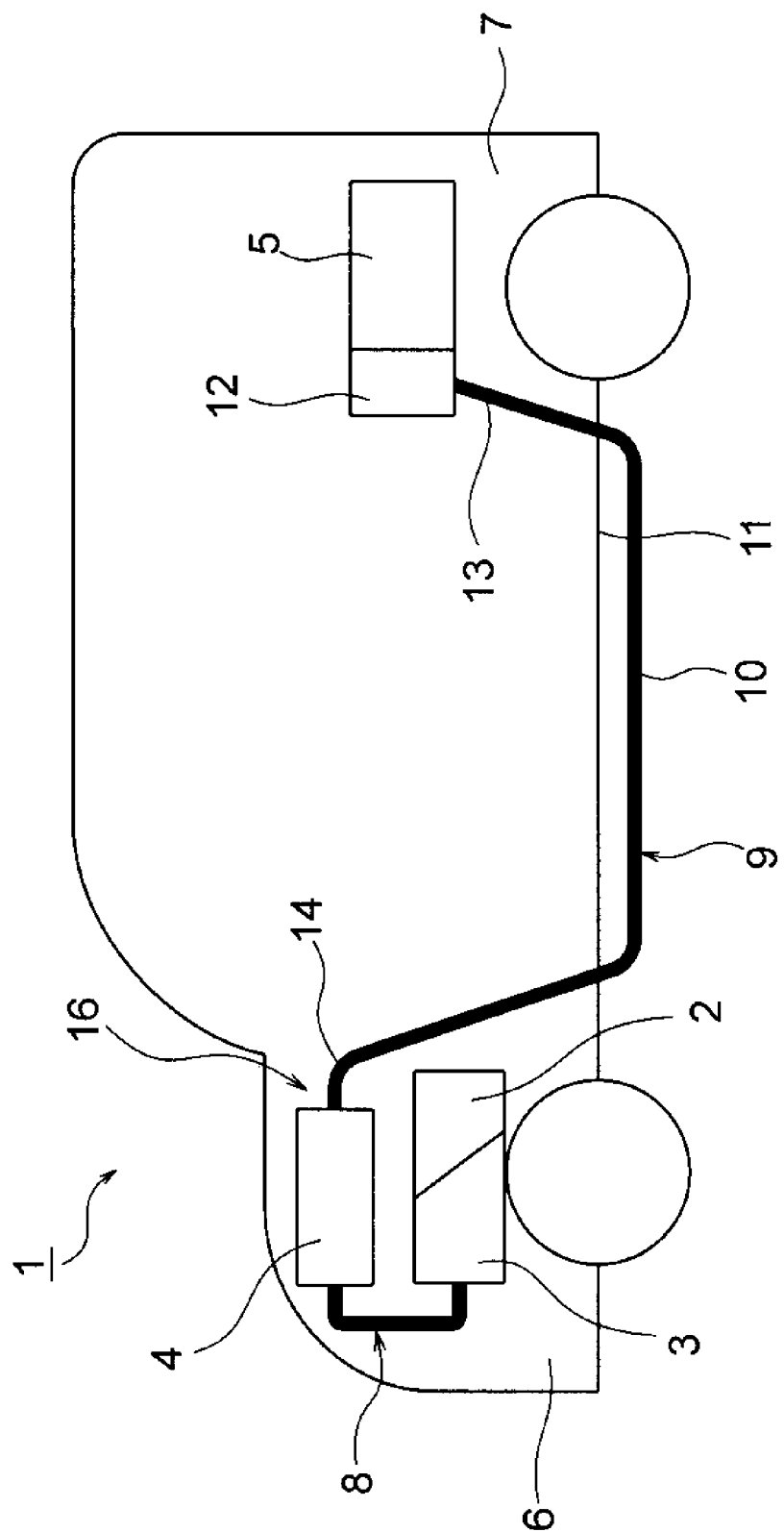
FIG. 1 is a schematic view illustrating an arrangement of a wire harness.
Figure 2:
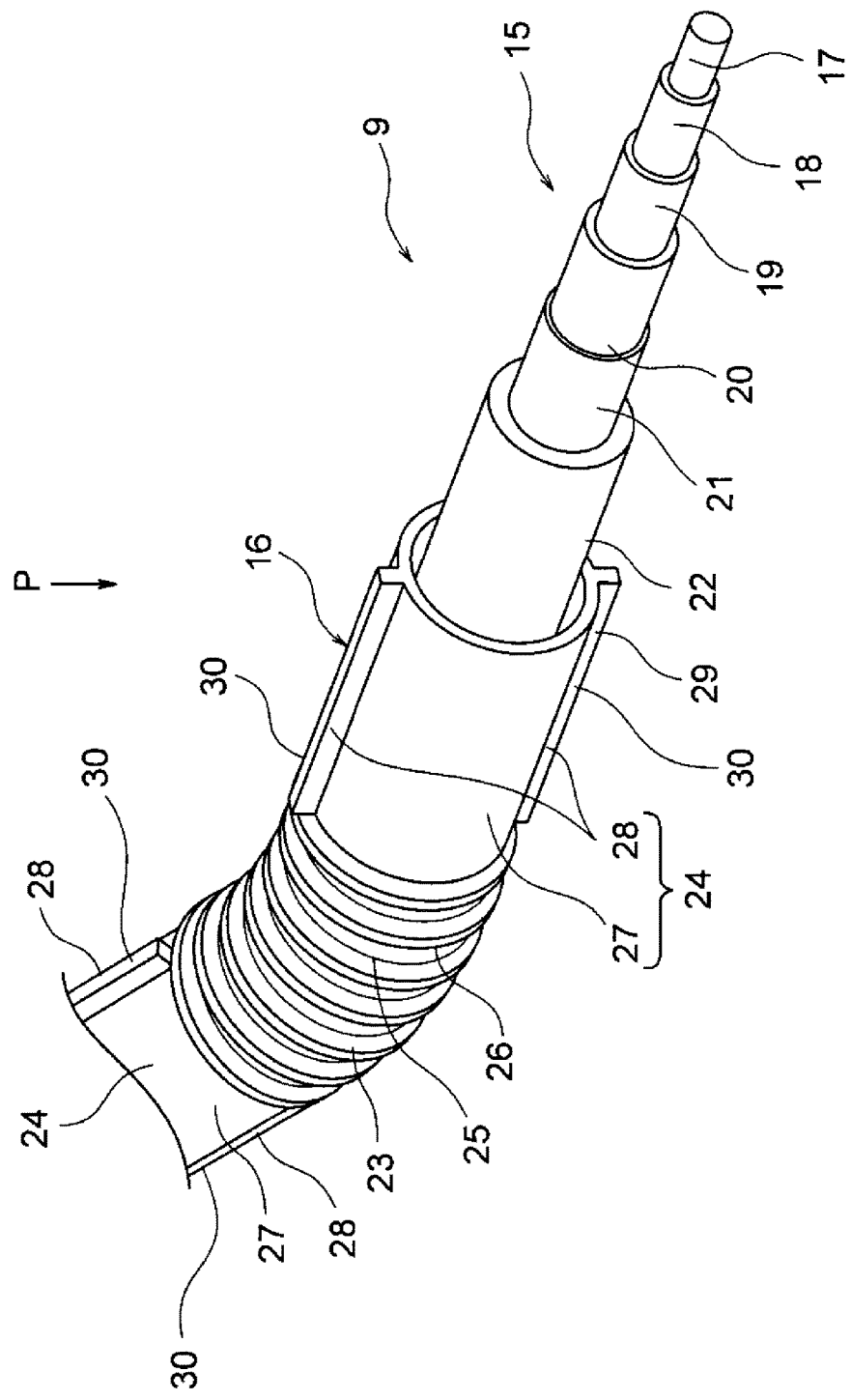
FIG. 2 is a structural view of the wire harness.
Figure 3:
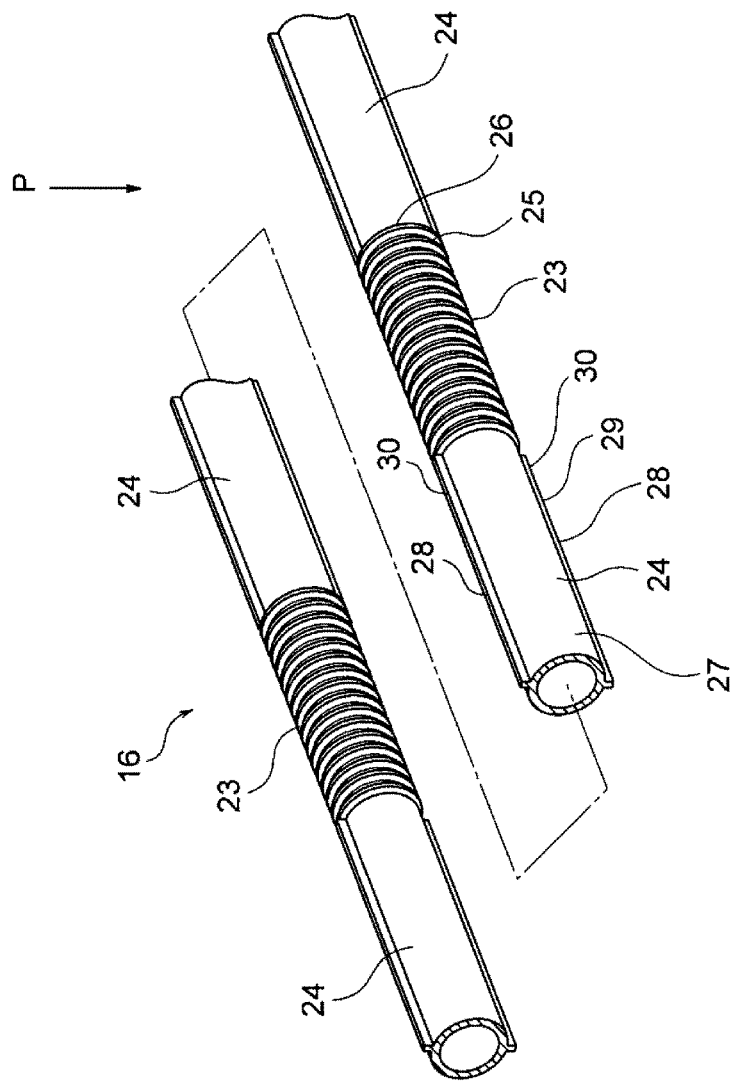
FIG. 3 is a perspective view of an exterior member.

Hereinafter, embodiments of a wire harness exterior member according to the present invention will be described with reference to FIG. 1 to FIG. 8B. FIG. 1 is a schematic view illustrating an arrangement of the wire harness according to the present invention. FIG. 2 is a structural view of the wire harness, FIG. 3 is a perspective view of the exterior member, and FIG. 4A to FIG. 8B are perspective views of the rigidity adding portions as other examples.

In the present embodiment, description will be given with an example where the wire harness including the wire harness exterior member of the embodiment is arranged to a hybrid car (this may be an electric car or a general car).

In FIG. 1, reference designation 1 represents a hybrid car. The hybrid car 1 is a vehicle driven by a mixture of two powers of an engine 2 and a motor unit 3. The motor unit 3 is supplied with the power from a battery 5 (in other words, a battery pack) through an inverter unit 4. The engine 2, the motor unit 3 and the inverter unit 4 are, in this example, mounted in an engine room 6 in a position close to the front wheels and the like. Moreover, the battery 5 is mounted in a vehicle rear portion 7 close to the rear wheels and the like. The battery 5 may be mounted in a car cabin that is present in the rear of the engine room 6.

The motor unit 3 and the inverter unit 4 are electrically connected to each other via a high-voltage wire harness 8. The battery 5 and the inverter unit 4 are also electrically connected to each other via a high-voltage wire harness 9. The wire harness 9 has its intermediate portion 10 arranged on the ground side of a vehicle underfloor portion surface 11. The wire harness 9 is substantially parallelly arranged along the vehicle underfloor portion 11. The vehicle underfloor portion 11 is a known body and is also a so-called panel member, and a through hole (not shown) is formed in a predetermined position. Through this through hole, the wire harness 9 is inserted.

The wire harness 9 and the battery 5 are electrically connected through a junction block 12 provided on this battery 5. To the junction block 12, a rear end portion 13 of the wire harness 9 is electrically connected by a known method. The side of a front end portion 14 of the wire harness 9 is electrically connected to the inverter unit 4 by a known method.

The motor unit 3 has a motor (not shown) and a generator (not shown). Moreover, the inverter unit 4 has an inverter (not shown) and a converter (not shown). The motor unit 3 is formed as a motor assembly including a shielding case (not shown). Moreover, the inverter unit 4 is formed as an inverter assembly including a shielding case (not shown). The battery 5 which is an Ni-MH or Li-ion battery is modularized. For example, an electric storage device such as a capacitor may be used. The battery 5 is not specifically limited as long as it can be used for the hybrid car 1 and an electric car.

First, the structure and composition of the wire harness 9 will be described. The wire harness 9 is a high voltage member for electrically connecting the inverter unit 4 and the battery 5 as mentioned above, and is structured so as to include a high-voltage coaxial composite conducting path 15 (that is, the conducting path) and an exterior member 16 (that is, the wire harness exterior member). The wire harness 9 of this structure has its path arranged, for example, so as to be hidden beside a non-illustrated reinforcement on the vehicle underfloor portion 11.

In FIG. 2, the high-voltage coaxial composite conducting path 15 has a positive circuit and a negative circuit in this single path. That is, the high-voltage coaxial composite conducting path 15 has two systems of circuits. Specifically, the high-voltage coaxial composite conducting path 15 has a first conducting path 17 that is circular in cross section and situated at the core of the high-voltage coaxial composite conducting path 15 and a first insulator 18 covering the periphery of this first conducting path 17 with a predetermined thickness. Moreover, the high-voltage coaxial composite conducting path 15 has a second conducting path 19 provided on the outside of the first insulator 18 and a second insulator 20 covering the periphery of this second conducting path 19 with a predetermined thickness. Further, the high-voltage coaxial composite conducting path 15 includes an electromagnetic shielding member 21 provided on the outside of the second insulator 20 and a sheath 22 covering the periphery of this electromagnetic shielding member 21 with a predetermined thickness.

The conducting path may be, other than the high-voltage coaxial composite conducting path 15 described above, a known high-voltage electric wire including a conductor and an insulator, a shielded wire, a cabtire cable, a bus bar provided with an insulator. The number of the conducting paths may be one or more.

While the high-voltage coaxial composite conducting path 15 is of two systems in the present embodiment, the present invention is not limited thereto; it may be of three systems, . . . a number, n, of systems. Moreover, the high-voltage coaxial composite conducting path 15 may have a structure not having the sheath 22.

In FIG. 2 and FIG. 3, the exterior member 16 is a tube body made of a resin for accommodating and protecting the high-voltage coaxial composite conducting path 15, and has a flexible tube portion 23 and an inflexible tube portion 24 (i.e., a straight tube portion). The flexible tube portion 23 becomes a bent portion during the shipping or the routing of the wire harness 9, and the inflexible tube portions 24 continues from the flexible tube portion 23. The inflexible tube portion 24 is provided as an inflexible portion. The exterior member 16 is, in the present embodiment, a resin molding product obtained by extrusion molding of a desired resin material. The exterior member 16 is not limited to a resin-made one but may be a metal-made one as long as it has a rigidity adding portion 28 described later.

While the flexible tube portion 23 and the inflexible tube portion 24 are each formed more than one in number in the present embodiment, they are formed at least one in number, and the number thereof is not specifically limited. That is, a structure may be adopted in which the number of flexible tube portions 23 is one and on each side thereof, one inflexible tube portion 24 is formed so as to be continuous therewith. Alternatively, a structure may be adopted in which the number of inflexible tube portions 24 is one and on each side thereof, one flexible tube portion 23 is formed so as to be continuous therewith.

The flexible tube portion 23 is formed in the configuration of an accordion tube having a depression 25 and a protrusion 26 formed around the periphery thereof in the circumferential direction, more than one in number continuously in the direction of the length thereof. The flexible tube portion 23 has its length set according to the bending range. The flexible tube portion 23 has bendability (in other words, flexibility) and is formed at a part that can be bent. The flexible tube portion 23 is formed at a part similar to a known corrugated tube in the present embodiment. The flexible tube portion 23 is not limited to the above-mentioned accordion tube configuration as long as it is bendable.

In the present embodiment, the flexible tube portion 23 has its cross-sectional shape formed so as to coincide with the cross-sectional shape of an inflexible tube body 27 described later (this is an example, and the cross-sectional shape may be a different one).

Since the exterior member 16 has the part of a configuration similar to that of a corrugated tube as mentioned above, it can be regarded as a "corrugated tube", a "partially corrugated tube" or the like.

The exterior member 16 is formed in a configuration where no slits are provided (that is, there are no incisions) in the direction of the tube axis thereof (that is, the direction of the length). As a reason that no slits are provided, the enhancement of rigidity and strength is cited. Moreover, improving waterproofing property by preventing water intrusion into the exterior member 16 is also cited. Further, making it difficult for the high-voltage coaxial composite conducting path 15 to be exposed, for example, from the bent part of the exterior member 16 is also cited.

The inflexible tube portion 24 has the inflexible tube body 27 (that is, the straight tube body) and a pair of rigidity adding portions 28. The inflexible tube body 27 is formed so as to be small in thickness as described later. Moreover, the inflexible tube body 27 is formed in the configuration of a straight tube that is circular in cross section. The cross section of the inflexible tube body 27 is not limited to circular but may be oval, elliptical, substantially rectangular or the like. See, e.g., FIG. 4A to FIG. 8B for the cross-sectional shape. The pair of rigidity adding portions 28 are provided on the inflexible tube body 27 to add rigidity. The pair of rigidity adding portions 28 are formed so that the inflexible tube body 27 becomes a portion that is not bent during the manufacture, shipping and routing of the wire harness 9. The portion that is not bent means a portion that is not positively provided with flexibility. That is, it can be said to be an inflexible part. Since the inflexible tube body 27 has a straight tube shape, the inflexible tube portion 24 can be regarded as a "straight tube portion" or a "straight tubular portion".

The inflexible tube body 27 has its thickness set to a thickness having a minimum strength. That is, the inflexible tube body 27 is formed so as to be small in thickness. Although there is concern about rigidity reduction accompanying the thickness setting resulting in a small thickness, rigidity is compensated by providing the rigidity adding portions 28 so as to be not less than the amount of rigidity reduction. The inflexible tube portion 24 has its second moment of area increased by providing the rigidity adding portions 28.

The rigidity adding portions 28 are formed as portions that add rigidity for preventing the inflexible tube body 27 from being deformed even when the inflexible tube body 27 is formed so as to be small in thickness. Regarding deformation, for example, at the time of assembly and fixing to the vehicle underfloor portion 11, a slight deformation to an extent that does not impair workability is permitted. The rigidity adding portions 28 are formed in a configuration that can resist a force in the direction shown by the arrow P in FIG. 3 (that is, self weight, the weight of the accommodated high-voltage coaxial composite conducting path 15, etc.).

The rigidity adding portions 28 are formed, in the present embodiment, so as to protrude from a lower part and an upper part of the outer surface of the inflexible tube body 27. That is, the rigidity adding portions 28 are provided so as to protrude on the outer surface of the inflexible tube body 27.

These lower part and upper part coincide with the vertically lower part and vertically upper part of the inflexible tube body 27 at the time of fixing of the wire harness 9 to the vehicle underfloor portion 11. The rigidity adding portions 28 are disposed on the lower part and the upper part, and formed so as to be one pair. The rigidity adding portions 28 are not limited to one pair but are formed at least on the lower part of the inflexible tube body 27.

The pair of rigidity adding portions 28 are formed so as to extend straight in the axial direction of the inflexible tube body 27. The pair of rigidity adding portions 28 are formed in the configuration of a ridge (in other words, a rib) that is rectangular in cross section (other shapes will be described later). The exterior member 16 can be formed by extrusion molding since the rigidity adding portions 28 are formed in the above-mentioned configuration. If it can be formed by extrusion molding, molding of an elongate exterior member 16 is possible.

The lower rigidity adding portion 28 of the pair of rigidity adding portions 28 is used as an anti-chipping portion 29 for resistance to chipping. The lower rigidity adding portion 28 as the anti-chipping portion 29 is capable of, even if pebble spattering or the like occurs during traveling, providing durability against this and preventing this from affecting the inflexible tube body 27 and the conducting paths provided inside. Moreover, the lower rigidity adding portion 28 as the anti-chipping portion 29 is, because of its configuration and disposition, also effective, for example, when the car drives over a curb or the like. As described above, the lower rigidity adding portion 28 is used also for improving the durability against external causes such as a curb.

The rigidity adding portions 28 are formed also as portions for increasing the surface area of the outer surface of the inflexible tube body 27. Since the heat emission amount of the inflexible tube portion 24 increases by the amount of the surface area of the rigidity adding portions 28, heat radiation effect (that is, cooling effect) can be enhanced. Since the rigidity adding portions 28 are portions capable of improving heat radiation performance as mentioned above, they are used also as heat dissipating portions 30.

The configuration of the rigidity adding portion 28 as described above may be changed to the ones shown in FIG. 4B to FIG. 4D, FIG. 5A to FIG. 5C, FIG. 6A to FIG. 6B, FIG. 7A to FIG. 7C or FIG. 8A to FIG. 8B. In FIG. 4A, the above-described rigidity adding portions 28 are shown.

In FIG. 4B, rigidity adding portions 128 are provided, as portions that add rigidity, so as to protrude outward from the lower part and upper part of the outer surface of the inflexible tube body 27. The rigidity adding portions 128 are disposed in threes in the direction of the arrow P (the number is an example). The plurality of rigidity adding portions 128 are provided in three pairs of upper and lower ones. The plurality of rigidity adding portions 128 are formed so as to extend straight in the axial direction of the inflexible tube body 27. The plurality of rigidity adding portions 128 are formed in the configuration of a ridge (in other words, a rib) that is rectangular in cross section. Reference designation 129 represents an anti-chipping portion 129. The rigidity adding portions 128 are used also as heat dissipating portions (reference designation is omitted).

In FIG. 4C, rigidity adding portions 228 are provided, as portions that add rigidity, so as to protrude outward from the lower part and upper part of the outer surface of the inflexible tube body 27. The rigidity adding portions 228 are provided a total of six in number: a pair of upper and lower ones disposed in the direction of the arrow P and two pairs of upper and lower ones disposed radially (the number is an example). The plurality of rigidity adding portions 228 are formed so as to extend straight in the axial direction of the inflexible tube body 27. The plurality of rigidity adding portions 228 are formed in the configuration of a ridge (in other words, a rib) that is rectangular in cross section. Reference designation 229 represents an anti-chipping portion. The rigidity adding portions 228 are used also as heat dissipating portions (reference designation is omitted).

In FIG. 4D, rigidity adding portions 328 are provided, as portions that add rigidity, so as to protrude outward from the lower part and upper part of the outer surface of the inflexible tube body 27 and to protrude outward from the right part and left part of the outer surface thereof. The rigidity adding portions 328 are provided a total of eight in number: a pair of upper and lower ones disposed in the direction of the arrow P, two pairs of upper and lower ones disposed radially and a pair of right and left ones (the number is an example). The plurality of rigidity adding portions 328 are formed so as to extend straight in the axial direction of the inflexible tube body 27. The plurality of rigidity adding portions 328 are formed in the configuration of a ridge (in other words, a rib) that is rectangular in cross section. In this case, advantages are produced such that assembly can be performed without regard to which side is up and that rigidity can be enhanced in all directions. Reference designation 329 represents an anti-chipping portion. The rigidity adding portions 328 are used also as heat dissipating portions (reference designation is omitted).

Figure 5A:
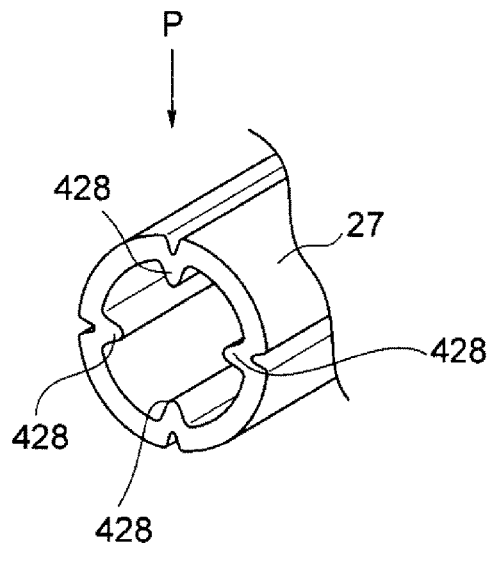
FIG. 5A to FIG. 5C are perspective views of still another example of the rigidity adding portion.

In FIG. 5A, rigidity adding portions 428 are formed, as portions that add rigidity, by such a manner that the lower part and upper part and the right part and left part of the inflexible tube body 27 are deformed inward as shown in the figure. The rigidity adding portions 428 are formed a total of four in number: a pair of upper and lower ones disposed in the direction of the arrow P and a pair of right and left ones (the number is an example). The plurality of rigidity adding portions 428 are formed so as to extend straight in the axial direction of the inflexible tube body 27. The plurality of rigidity adding portions 428 are formed in the configuration of a ridge (in other words, a rib) that is substantially U-shaped in cross section.

Figure 5C:
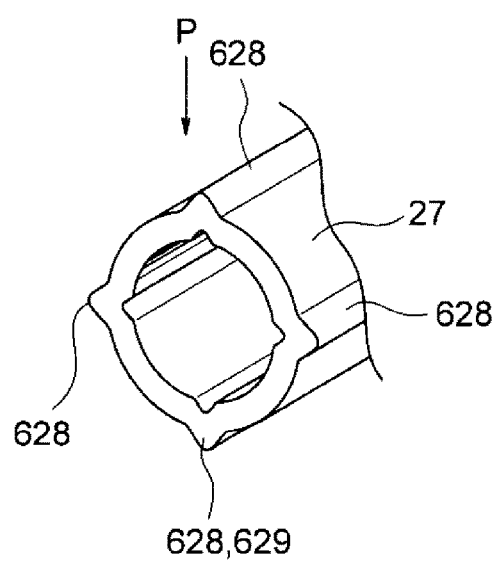
Figure 5B:
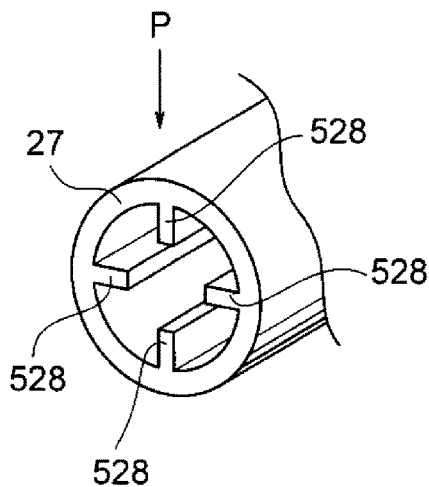

In FIG. 5B, rigidity adding portions 528 are provided, as portions that add rigidity, so as to protrude inward from the lower part and upper part of the outer surface of the inflexible tube body 27. That is, the rigidity adding portions 28 are provided so as to protrude on the inner surface of the inflexible tube body 27. The rigidity adding portions 528 are provided a total of four in number: a pair of upper and lower ones disposed in the direction of the arrow P and a pair of right and left ones (the number is an example). The plurality of rigidity adding portions 528 are formed so as to extend straight in the axial direction of the inflexible tube body 27. The plurality of rigidity adding portions 528 are formed in the configuration of a ridge (in other words, a rib) that is rectangular in cross section.

In FIG. 5C, rigidity adding portions 628 are formed, as portions that add rigidity, by such a manner that the lower part and upper part and the right part and left part of the inflexible tube body 27 are deformed outward as shown in the figure. The rigidity adding portions 628 are formed a total of four in number: a pair of upper and lower ones disposed in the direction of the arrow P and a pair of right and left ones (the number is an example). The plurality of rigidity adding portions 628 are formed so as to extend straight in the axial direction of the inflexible tube body 27. The plurality of rigidity adding portions 628 are formed in the configuration of a ridge (in other words, a rib) that is semicircular in cross section. Reference designation 629 represents an anti-chipping portion.

Figure 6A:
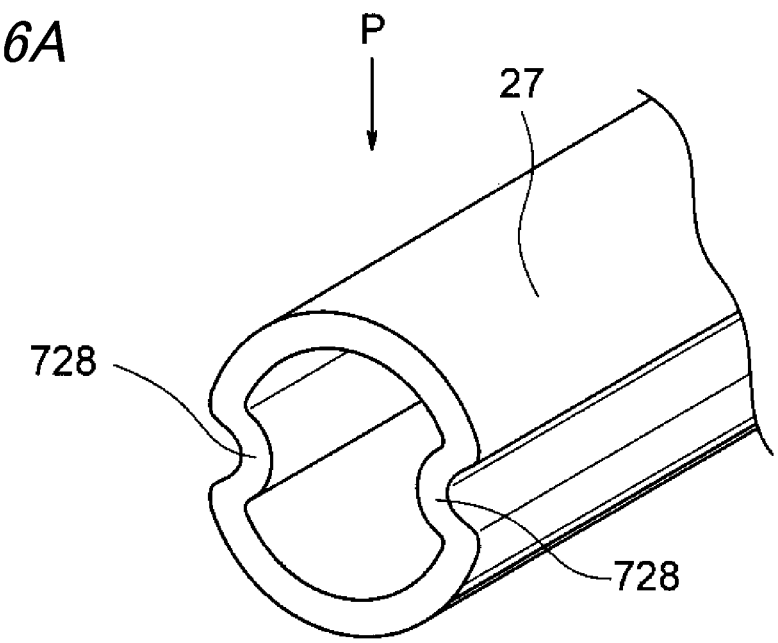
FIG. 6A and FIG. 6B are perspective views of yet another example of the rigidity adding portion.

In FIG. 6A, rigidity adding portions 728 are formed, as portions that add rigidity, by such a manner that the right part and left part of the inflexible tube body 27 are deformed inward as shown in the figure. The pair of rigidity adding portions 728 are formed so as to extend straight in the axial direction of the inflexible tube body 27. When the inflexible tube body 27 is made of, for example, a metal, the pair of rigidity adding portions 728 are formed in a configuration such that press lines are formed. The inflexible tube body 27 is not limited to a metal-made one but may be made of a resin and formed into the configuration shown in FIG. 6A by extrusion molding.

Figure 6B:
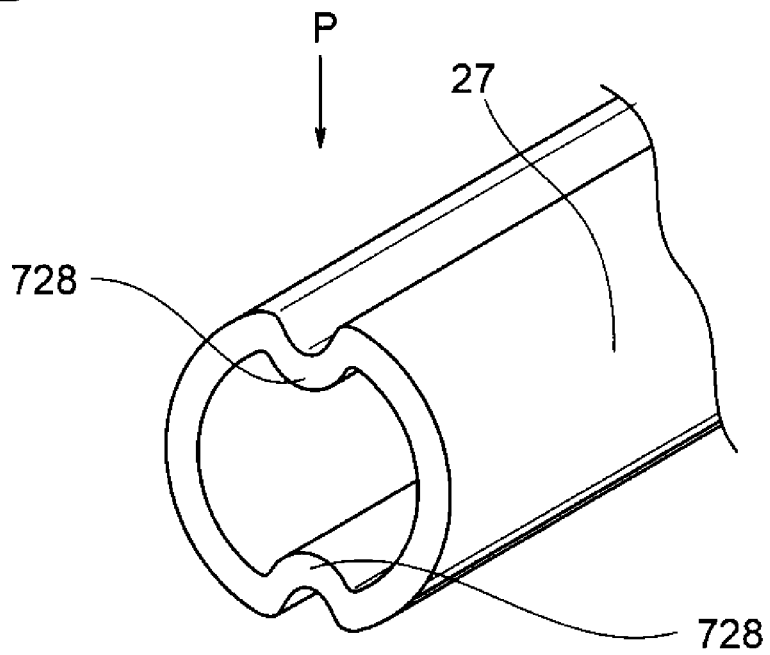

The pair of rigidity adding portions 728 may be disposed on the lower part and upper part of the inflexible tube body 27 as shown in FIG. 6B.

Figure 7A:
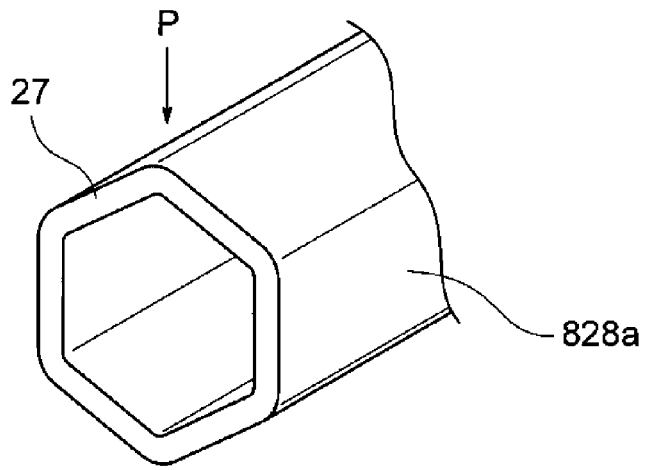
FIG. 7A to FIG. 7C are perspective views of still yet another example of the rigidity adding portion.

In FIG. 7A, a rigidity adding portion 828a is formed, as a portion that adds rigidity, such that the inflexible tube body 27 is deformed into, for example, a substantial regular hexagon. The rigidity adding portion 828a corresponds to all the part where the inflexible tube body 27 is deformed from the condition of being circular in cross section to the polygon. In this case, the rigidity adding portion 828a is also formed so that the surface area of the inflexible tube body 27 is large compared with the case of being circular in cross section. Moreover, since the rigidity adding portion 828a has a part extending in the direction of the arrow P, this part acts to resist against deformation. Since the surface area is increased in the rigidity adding portion 828a as described above, the heat radiation performance of the inflexible tube body 27 can be enhanced by the increase amount.

Figure 7B:
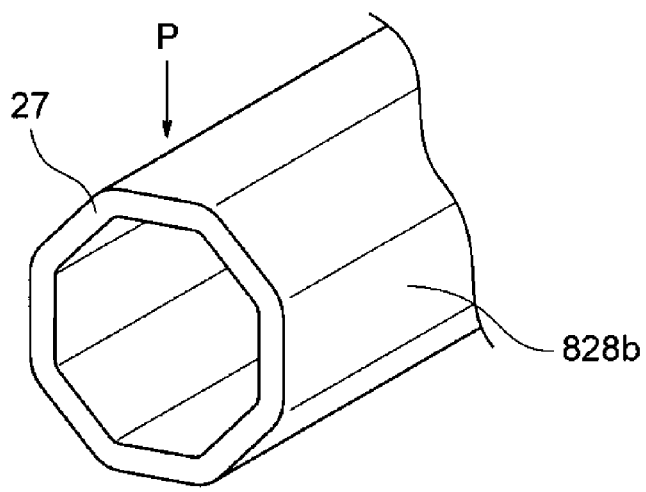
Figure 7C:
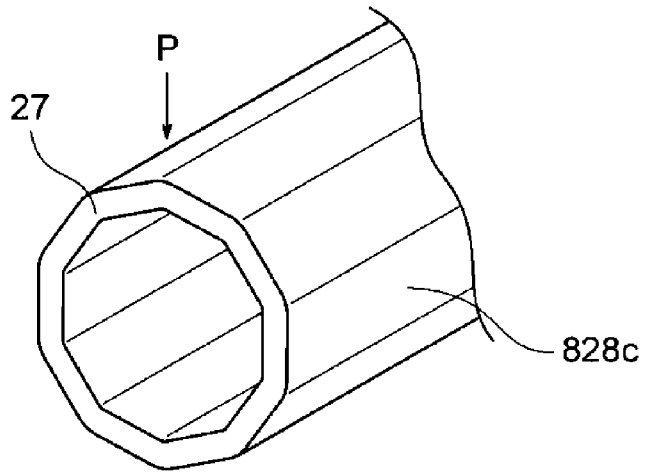

The inflexible tube body 27 may be changed to, for example, a substantial regular octagon as shown in FIG. 7B to form a rigidity adding portion 828b. Moreover, the inflexible tube body 27 may be changed to, for example, a substantial regular decagon as shown in FIG. 7C to form a rigidity adding portion 828c (the number of angles is an example).

Figure 8A:
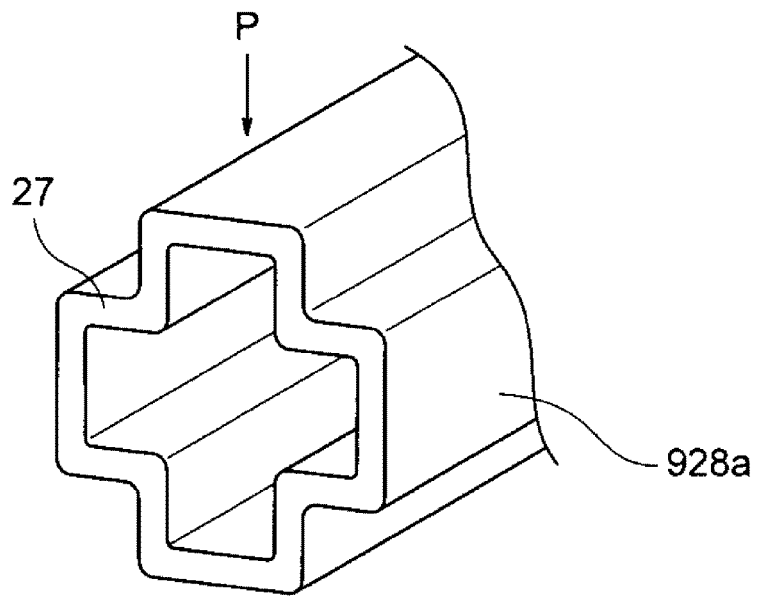
FIG. 8A and FIG. 8B are perspective views of yet still another example of the rigidity adding portion.
Figure 8B:
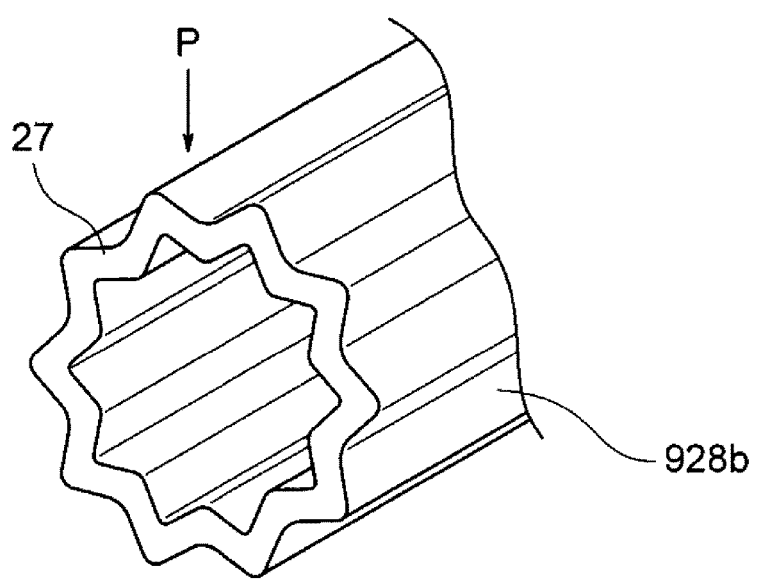

Further, the inflexible tube body 27 may be changed to, for example, a substantial cross shape as shown in FIG. 8A to form a rigidity adding portion 928a. Moreover, the inflexible tube body 27 may be changed to, for example, a substantial star shape as shown in FIG. 8B to form a rigidity adding portion 928b.

As described above with reference to FIG. 1 to FIG. 8B, according to the wire harness 9, since at least one rigidity adding portion 28 as a portion that adds rigidity is provided on the inflexible tube body 27 of the exterior member 16, the second moment of area of the inflexible tube body 27 can be increased by the rigidity adding portion 28. Therefore, a necessary and sufficient rigidity is easily secured. Consequently, the inflexible tube body 27 can be reduced in thickness, so that the weight and cost of the wire harness 9 can be reduced.

Moreover, according to the wire harness 9, since the rigidity of the inflexible tube body 27 can be secured by the rigidity adding portion 28, even if the inflexible tube body 27 is reduced in thickness, the inflexible tube body 27 can be prevented from being deformed. Consequently, the workability at the time of manufacture of the wire harness 9 and the workability at the time of fixing of the wire harness 9 to the vehicle underfloor portion 11 and the like can be improved.

The wire harness 9 and the exterior member 16 according to the embodiment are summarized as follows:

(1) The exterior member 16 (a wire harness exterior member) is a wire harness exterior member having a shape of a tube body covering the high-voltage coaxial composite conducting path 15 (an electrically-conducting path). The exterior member 16 has the inflexible tube body 27 (straight tube body) to be arranged at a vehicle underfloor portion 11 of a vehicle and at least one rigidity adding portion (28, 128, 228, 328, 428, 528, 628, 728, 828a-c, 928a-b) to add rigidity to the inflexible tube body 27.

(2) In the exterior member 16, the rigidity adding portion is provided so as to protrude on the outer surface of the inflexible tube body 27 or is formed such that the inflexible tube body 27 is deformed outward.

(3) In the exterior member 16, the rigidity adding portion is provided so as to protrude on the inner surface of the inflexible tube body 27 or is formed such that the inflexible tube body 27 is deformed inward.

(4) In the exterior member 16, the rigidity adding portion is formed such that the surface area of the outer surface of the inflexible tube body 27 is large as compared with the case where the cross section of the inflexible tube body 27 is circular.

(5) In the exterior member 16, the rigidity adding portion is formed to have a shape extending in the axial direction of the inflexible tube body 27.

(6) The exterior member 16 has the inflexible tube portion 24 (straight tube portion) including the inflexible tube body 27 and the rigidity adding portion and formed as an inflexible portion, and the flexible tube portion 23 continuing from the inflexible tube portion 24 and formed as a flexible portion.

(7) In the exterior member 16, the rigidity adding portion is provided at a vertically lower side of the outer surface of the inflexible tube body 27 in a state of being fixed to the vehicle underfloor portion 11.

(8) In the exterior member 16, the rigidity adding portion is provided also at a vertically upper side of the outer surface of the inflexible tube body 27 in the state of being fixed to the vehicle underfloor portion 11.

(9) The wire harness 9 includes the exterior member 16 of any one of the above (1) to (8) and the high-voltage coaxial composite conducting path 15 (electrically-conducting path) covered with the exterior member 16.

Of course, the present invention can be implemented with various changes without changing the gist of the present invention.

What is claimed is:

1. A wire harness exterior member having a shape of a tube body covering a conducting path,
the wire harness exterior member comprising a straight tube body to be arranged at a vehicle underfloor portion of a vehicle, and at least one rigidity adding portion, adding rigidity to the straight tube body, and extending uninterrupted along the straight tube body from a first flexible tube portion, at a first longitudinal end of the straight tube body, to a second flexible tube portion, at a second longitudinal end of the straight tube body opposite the first longitudinal end, the at least one rigidity adding portion not being provided on the first flexible tube portion and the second flexible tube portion,
wherein the first flexible tube portion is corrugated comprising depressions and protrusions, and
wherein a height of the at least one rigidity adding portion in a radial direction of the straight tube body is greater than a height of the protrusions in a radial direction of the first flexible tube portions.

2. The wire harness exterior member according to claim 1, wherein the rigidity adding portion is provided so as to protrude on an outer surface of the straight tube body, or the rigidity adding portion is formed such that the straight tube body is deformed outward.

3. The wire harness exterior member according to claim 2, wherein the rigidity adding portion is formed such that a surface area of the straight tube body is large as compared with a case where a cross section of the straight tube body is circular.

4. The wire harness exterior member according to claim 1, wherein the rigidity adding portion is provided so as to protrude on an inner surface of the straight tube body, or the rigidity adding portion is formed such that the straight tube body is deformed inward.

5. The wire harness exterior member according to claim 1, wherein the rigidity adding portion is formed to have a shape extending in an axial direction of the straight tube body.

6. The wire harness exterior member according to claim 1, comprising a straight tube portion including the straight tube body and the rigidity adding portion and formed as an inflexible portion, and the first flexible tube portion continuing from the straight tube portion and formed as a flexible portion.

7. The wire harness exterior member according to claim 6, wherein the straight tube portion, including the straight tube body and the rigidity adding portion, and the first flexible tube portion are formed as an extrusion molded resin product.

8. The wire harness exterior member according to claim 1, wherein the rigidity adding portion is provided at a vertically lower side of an outer surface of the straight tube body in a state of being fixed to the vehicle underfloor portion.

9. The wire harness exterior member according to claim 8, wherein the rigidity adding portion is provided also at a vertically upper side of the outer surface of the straight tube body in the state of being fixing to the vehicle underfloor portion.

10. The wire harness exterior member according to claim 1, wherein the straight tube body is formed in a shape of a regular polygon having at least six sides.

11. The wire harness exterior member according to claim 1, wherein the straight tube body is formed in a star shape.

12. The wire harness exterior member according to claim 1, wherein a first longitudinal end and an opposing second longitudinal end of the rigidity adding member end at a boundary of the first flexible tube portion and the second flexible tube portion respectively.

13. A wire harness comprising a wire harness exterior member, and a conducting path covered by the wire harness exterior member,
wherein the wire harness exterior member having a shape of a tube body covering the conducting path,
wherein the wire harness exterior member comprises a straight tube body to be arranged at a vehicle underfloor portion of a vehicle, and at least one rigidity adding portion, adding rigidity to the straight tube body, and extending uninterrupted along the straight tube body from a first flexible tube portion, at a first longitudinal end of the straight tube body, to a second flexible tube portion, at a second longitudinal end of the straight tube body opposite the first longitudinal end, the at least one rigidity adding portion not being provided on the first flexible tube portion and the second flexible tube portion,
wherein the first flexible tube portion is corrugated comprising depressions and protrusions, and
wherein a height of the at least one rigidity adding portion in a radial direction of the straight tube body is greater than a height of the protrusions in a radial direction of the flexible tube portion.

14. The wire harness exterior member according to claim 8, wherein the wire harness exterior member is provided without slits in a longitudinal direction of the straight tube body.

* * * * *